(12) United States Patent
Hatayama et al.

(10) Patent No.: US 9,113,003 B2
(45) Date of Patent: Aug. 18, 2015

(54) SHEET LOADING DEVICE, IMAGE READING DEVICE, AND IMAGE FORMING APPARATUS

(71) Applicants: Koji Hatayama, Ebina (JP); Shohei Shinkawa, Komae (JP); Yasunobu Youda, Sagamihara (JP)

(72) Inventors: Koji Hatayama, Ebina (JP); Shohei Shinkawa, Komae (JP); Yasunobu Youda, Sagamihara (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/300,992

(22) Filed: Jun. 10, 2014

(65) Prior Publication Data
US 2014/0376014 A1    Dec. 25, 2014

(30) Foreign Application Priority Data

Jun. 19, 2013 (JP) ................ 2013-128647

(51) Int. Cl.
G06K 15/16 (2006.01)
H04N 1/00 (2006.01)

(52) U.S. Cl.
CPC ..................... H04N 1/00 (2013.01)

(58) Field of Classification Search
USPC .............. 358/1.12, 1.13, 1.14, 498, 496, 474; 399/38, 110, 111; 271/207, 213
See application file for complete search history.

(56) References Cited

U.S. PATENT DOCUMENTS

| | | | |
|---|---|---|---|
| 7,454,156 B2 * | 11/2008 | Wakiyama | 399/111 |
| 8,573,584 B2 * | 11/2013 | Idehara et al. | 271/3.14 |
| 2006/0158701 A1 * | 7/2006 | Park et al. | 358/498 |
| 2008/0317498 A1 * | 12/2008 | Andoh et al. | 399/110 |
| 2009/0324263 A1 * | 12/2009 | Shimizu et al. | 399/38 |

* cited by examiner

Primary Examiner — Allen H Nguyen
(74) Attorney, Agent, or Firm — Oblon, McClelland, Maier & Neustadt, L.L.P.

(57) ABSTRACT

A sheet loading device including a document feeder, an image reading unit, an image forming, a discharge member, and a combined tray. The combined tray functions as a document feeding tray which loads the document to feed to the image reading unit when the combined tray is opened, and the combined tray functions as the discharge tray which loads the recording medium when the combined tray is closed.

7 Claims, 7 Drawing Sheets

SHEET LOADING DEVICE, IMAGE READING DEVICE, AND IMAGE FORMING APPARATUS

TECHNICAL FIELD

Exemplary aspects of the present application generally relate to a sheet loading device, an image reading device and an image forming apparatus.

BACKGROUND ART

In general, a sheet conveying unit includes a sheet loading tray to load a sheet and a discharge tray to load a discharged sheet. JP4-308129A discloses the sheet loading tray and the discharge tray are arranged on vertical direction to be mutually separated, and a part of the sheet loading tray serves for the discharge tray. Therefore the unit and the installation area is capable of being small.

However if the sheet conveying unit is mounted on a multi-functional machine having two or more functions including a copying machine, a printer, a facsimile apparatus, etc, a discharge tray for a recording sheet is necessary in addition to a sheet loading tray and another discharge tray. Here, the sheet loading tray and the discharge tray for a loaded sheet do not serve as a discharge tray for a recording sheet. Therefore, the sheet conveying unit has problem that the discharge tray for a recording sheet must be arranged independently under the sheet conveying unit and the height of the unit cannot be lowered.

SUMMARY

In light of the problems and circumstances as described above, a main object of the present application is to provide a sheet loading device, an image reading device and an image forming apparatus that the height of the unit can be lowered and the unit and the installation area is capable of being small.

According to an embodiment of the present application, a sheet loading device is included in an image forming apparatus to form the image on a recording medium which of a document is read by an image reading device or which of a document is received by an external equipment, includes a combined tray which is attached to the image reading device so as to be opened and closed, wherein the combined tray functions as a document feeding tray on which a document to feed to the image reading device is loaded when the combined tray is opened, the combined tray functions as the discharge tray on which a recording medium formed an image is loaded when the combined tray is closed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION

Figure 1:
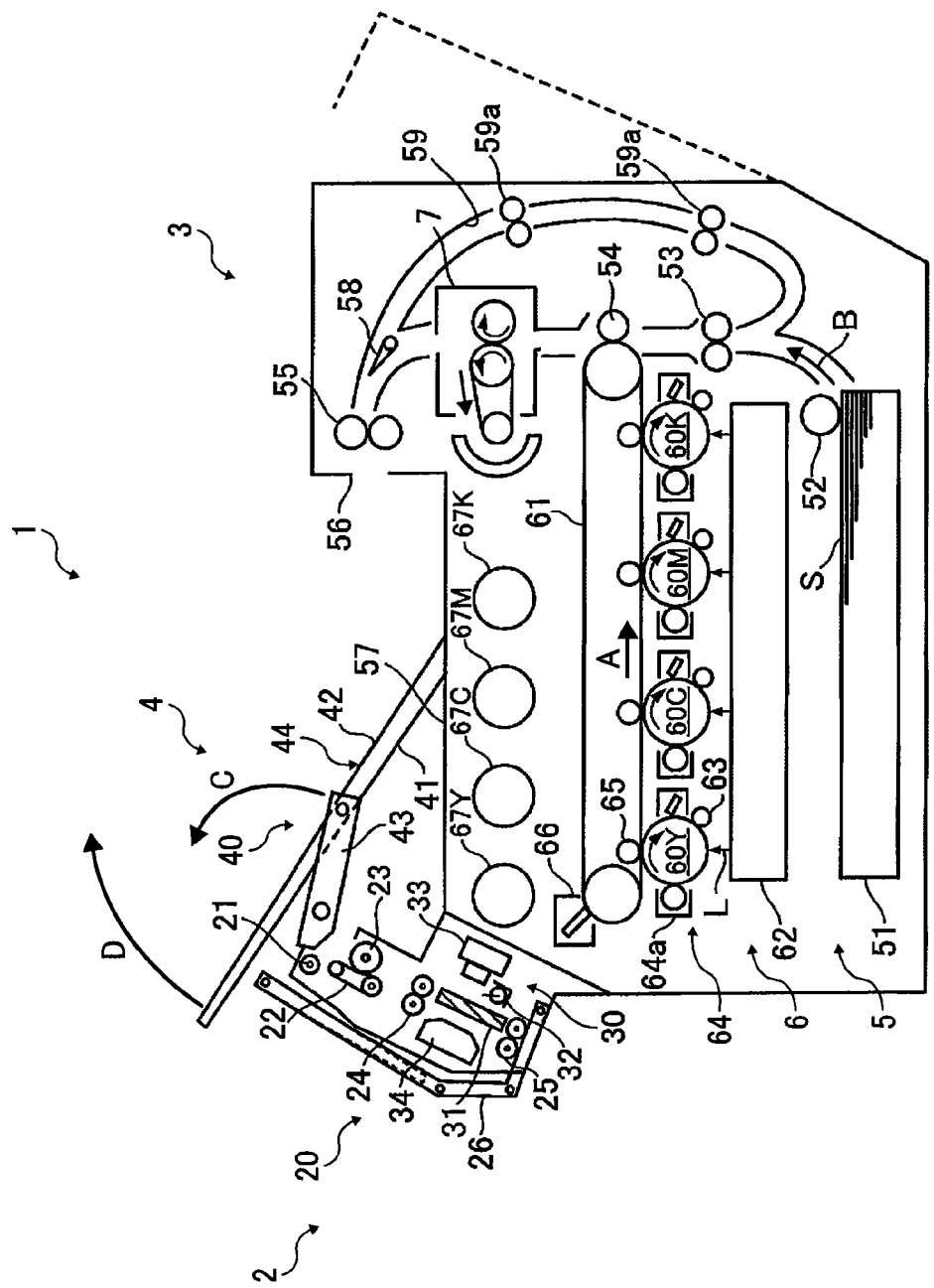
FIG. 1 is a diagram showing a schematic configuration of the image forming apparatus which shows embodiment of the present application, and in a state that the combined tray is closed.

Referring now to the drawings, wherein like reference numerals designate identical or corresponding parts throughout the several views. Further, as used herein, the words "a," "an" and the like generally carry a meaning of "one or more," unless stated otherwise.

FIG. 1 is a diagram showing a schematic configuration of the image forming apparatus which shows embodiment of the present application, and in a state that the combined tray is closed.

The image forming apparatus of an embodiment of the present application is, for example, a multi-functional machine having two or more functions including a copying machine, a printer, a facsimile apparatus, etc.

In FIG. 1 an image forming apparatus 1 includes an image reading device 2, an apparatus body 3, and a sheet loading device 4. The image forming apparatus forms the image on a recording medium S, the image being read by an image reading device or received by an external equipment.

The image reading device 2 includes an auto document feeder 20 (ADF) to convey a document loaded on a document feeding tray, and an image reading unit 30 to read the document conveyed by ADF 20.

Figure 2:
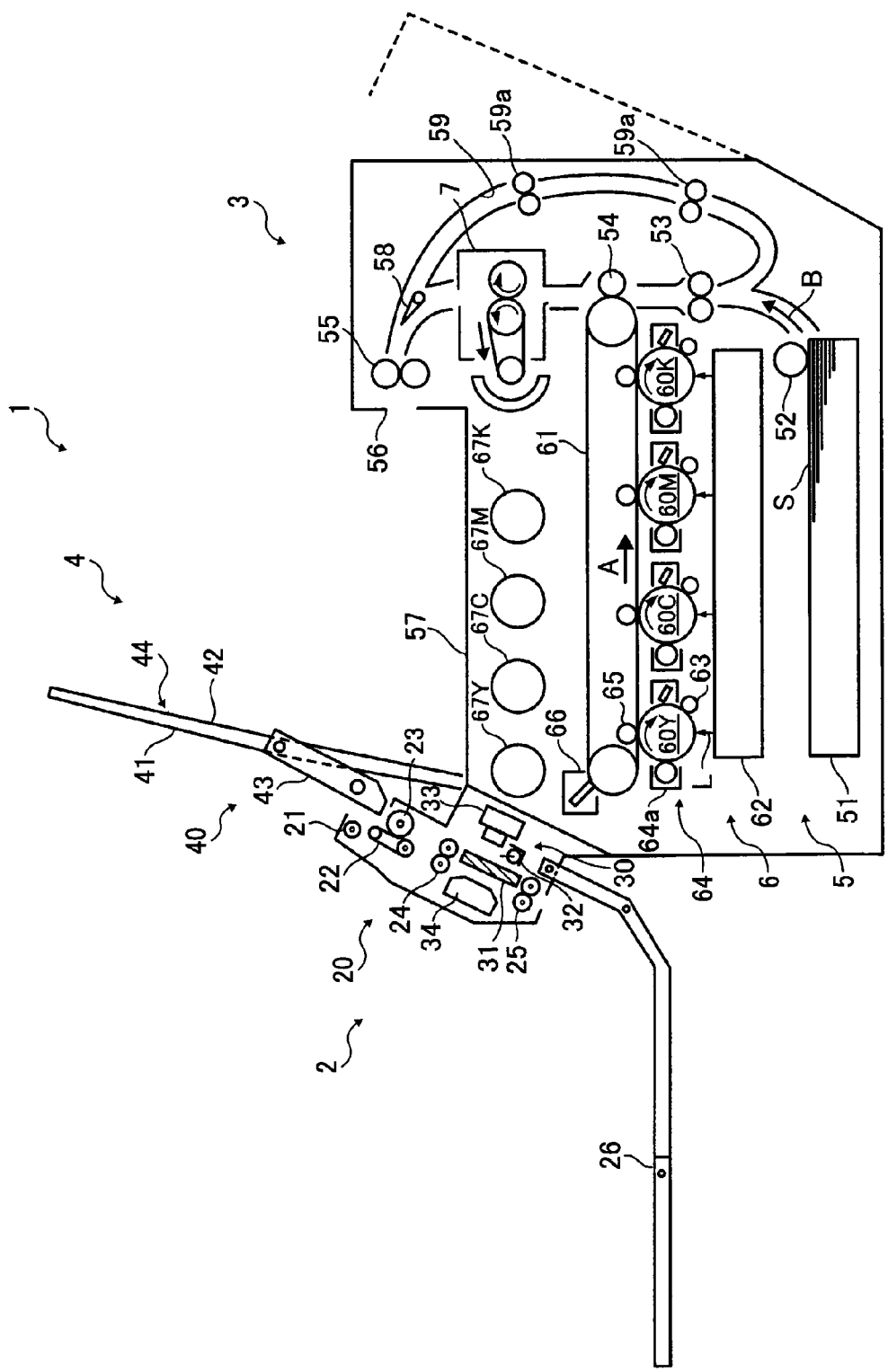
FIG. 2 is a diagram showing a schematic configuration of the image forming apparatus which shows embodiment of the present application, and in a state that a combined tray is opened.

ADF 20 includes the document feeding tray shown in FIG. 2, a pickup roller 21, a sheet feeding belt 22, a reverse roller 23, a conveying roller pair 24, a sheet discharge roller pair 25, and a document discharge tray 26.

The document feeding tray is capable of loading plural documents. The pickup roller 21 is movable between a position that abuts on an upper surface of a document bundle and a leaving position adjacent to the upper surface. Therefore the pickup roller 21 abuts on an upper surface of a document bundle and can pick up at least one document of the document bundle, and the pickup roller 21 feeds the document picked up to the sheet feeding belt 22.

The sheet feeding belt 22 rotates in a sheet feeding direction, and the reverse roller 23 rotates in the opposite direction. A separating pad also can be used instead of the reverse roller 23.

The sheet discharge roller pair 25 discharges a document read at the reading position to the document discharge tray 26. The document discharge tray 26 is folded along the shape of the image reading device 2 when ADF is not used, for example, the image forming apparatus 1 is used as a printer. As a result, the image forming apparatus 1 can be miniaturized when ADF is not used.

The image reading unit 30 includes a slit glass 31, a light source 32, and an image sensor 33. The slit glass 31 is arranged and fixed along a conveyance route between the conveying roller pair 24 and the sheet discharge roller pair 25.

The light source 32 is arranged on the opposite side to the conveyance route across the slit glass 31, and irradiates light on the document which is passing on the slit glass 31. A reflection guide plate 34 is arranged on the opposite side to the slit glass 31 across the conveyance route. The reflection guide plate 34 reflects light of the light source 32. The light reflected on the document is imaged so the image sensor 33 reads an image of a document.

The apparatus body 3 includes a sheet feeding unit 5, an image forming unit 6, and a fixing device 7. The sheet feeding unit 5 feeds a recording medium S to a resist roller pair 53. The resist roller pair 53 conveys the recording medium S between a intermediate transfer belt 61 and a secondary transfer roller 54.

The image forming unit 6 includes photoreceptors (60Y, 60C, 60M, 60K), the intermediate transfer belt 61 and an optical writing unit 62. The image forming unit 6 forms a toner image on the recording medium S. The recording medium S formed with the toner image is conveyed to the fixing device 7.

The fixing device 7 is arranged above the image forming unit 6, melts the toner image on the recording medium S, and fixes it as a image on the recording medium S.

The recording medium S fixed with the image is discharged out of the apparatus body 3 with a discharging roller pair 55 through an outlet 56.

The discharged recording medium S is loaded on a second discharge tray 57 arranged over the image forming unit 6 when a combined tray 40 is opened.

The image reading device 2 is arranged over the image forming unit 6 and apart from the outlet 56, that is, arranged on the opposite side of the outlet 56 through the second discharge tray 57. The image reading device 2 is arranged in space under the outlet 56 so that the height of the apparatus body 3 can be lower.

A change lever 58 is arranged at the upstream side in the conveying direction of the discharging roller pair 55. The change lever 58 changes to a reversing path 59 when an image is formed completely on a front surface of the recording medium S and another image is formed on a rear surface of the recording medium S.

The sheet loading device 4 includes the combined tray 40 which can be opened/closed to the image reading device 2. As shown in FIG. 2, the combined tray 40 functions as a document feeding tray on which a document to feed to the image reading device 2 is loaded when the combined tray 40 is opened. On the other hand, as shown in FIG. 1, the combined tray 40 functions as the discharge tray on which a recording medium S formed an image is loaded when the combined tray 40 is closed.

Figure 3:
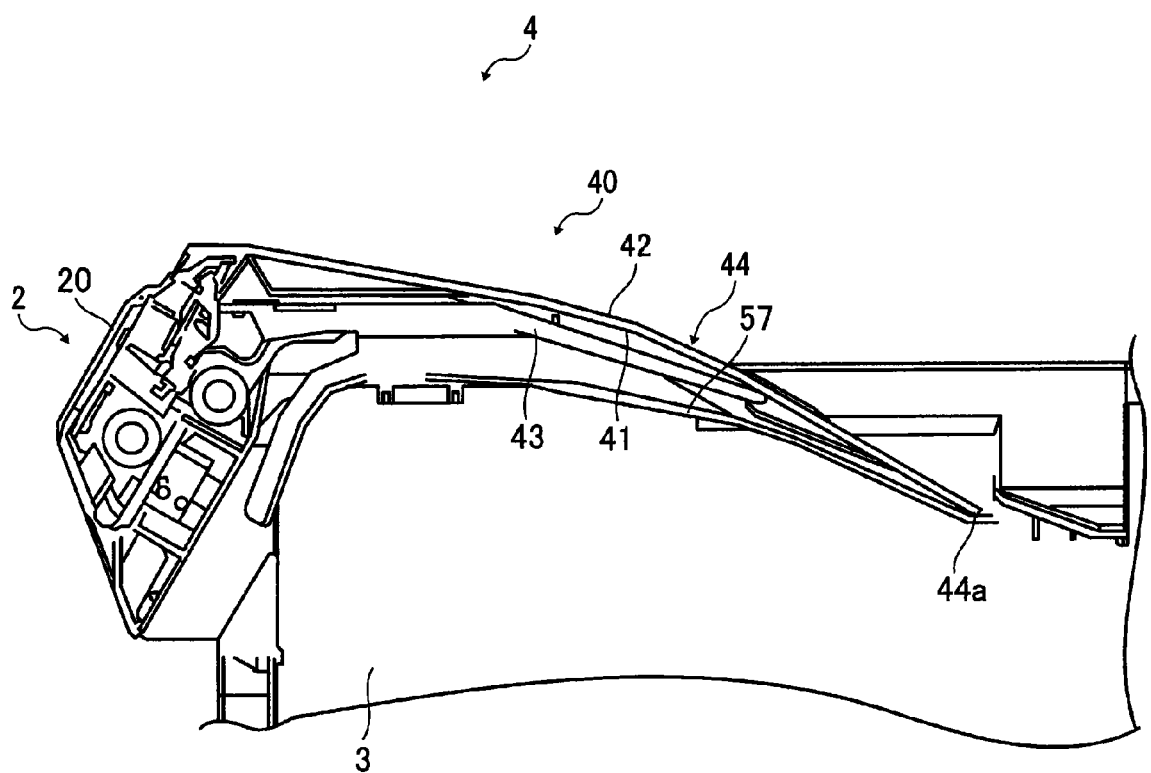
FIG. 3 is a schematic diagram showing in a state that the combined tray which shows embodiment of the present application is closed.
Figure 4:
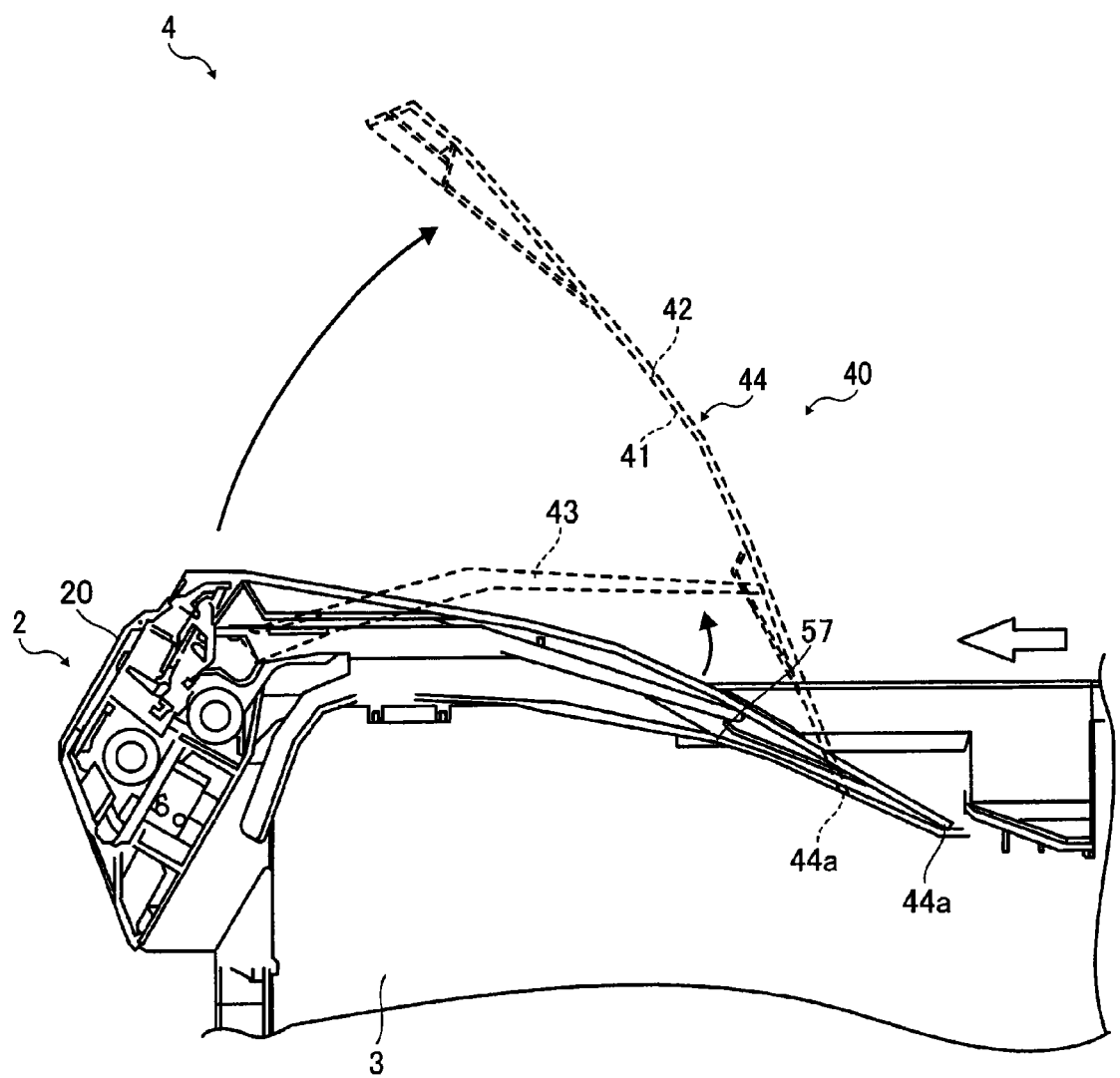
FIG. 4 is a schematic diagram illustrating an operation that the combined tray which shows embodiment of the present application is opened.
Figure 5:
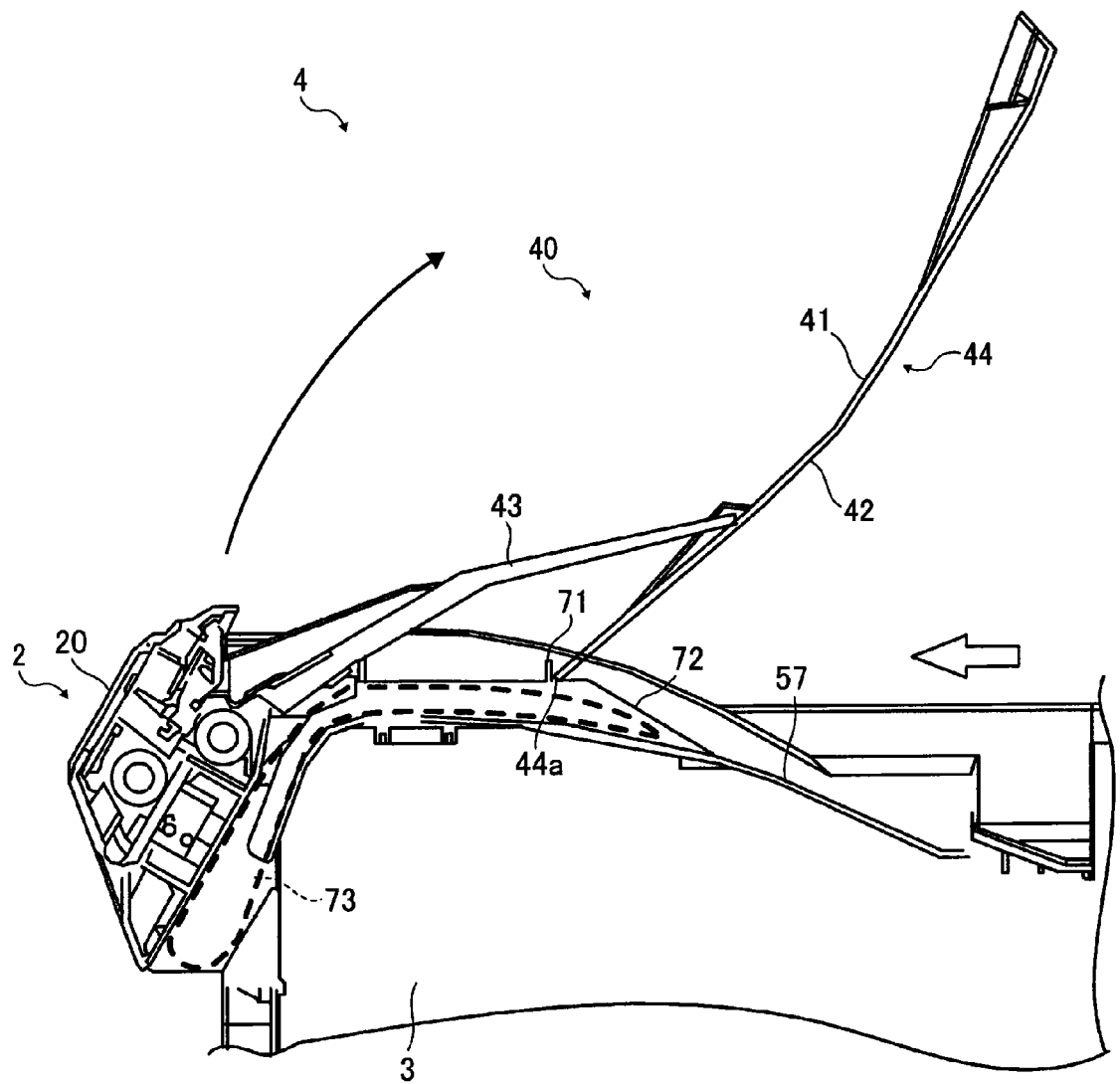
FIG. 5 is a schematic diagram showing in a state that the combined tray which shows embodiment of the present application is opened.

As shown in FIGS. 3-5, the combined tray 40 includes a rotatable member 43 and a tray plate 44.

The rotatable member 43 is attached freely rotatable to ADF 20. For example, in FIG. 1, the rotatable member 43 rotates as shown in a direction by an arrow C when the combined tray 40 is in a opened state from the closed state.

The tray plate 44 is attached to the tip of the rotatable member 43 and rotates in a reverse direction to the rotatory direction of the rotatable member 43. For example, in FIG. 1, the tray plate 44 rotates as shown in a direction by an arrow D with a connection part to the rotatable member 43 as a fulcrum when the combined tray 40 is in a opened state from the closed state.

In FIG. 1, the combined tray 40 is configured to be in the opened state by such configuration when the tray plate 44 rotates in the direction of the arrow D from the closed state.

In FIG. 3, the loading surface 42 of the tray plate 44 functions as the discharge tray when the combined tray 40 is closed. On the other hand, as shown in FIG. 5, a document loading surface 41 of the tray plate 44 functions as the document feeding tray when the combined tray 40 is open.

In FIG. 5, a tip 44a of the tray plate 44 contacts a stopper 71 over the image forming unit 6 when the combined tray 40 is in a opened state. Therefore the angle of the tray plate 44 is maintained to be the predetermined angle.

On the other hand, a sloping face 72 which slopes from the stopper 71 to the outlet 56 shown in FIG. 1 is arranged over the image forming unit 6.

In addition, in FIG. 5, a gap 73 shown by a dashed line is formed between the image reading device 2 and the image forming unit 6. The tip of the recording medium S discharged on the second discharge tray 57 can be inserted in the gap 73. Therefore, a large recording medium can be also loaded on the second discharge tray 57.

FIGS. 3-7 illustrates the operations which shows the sheet loading device 4 of the present application.

Figure 6:
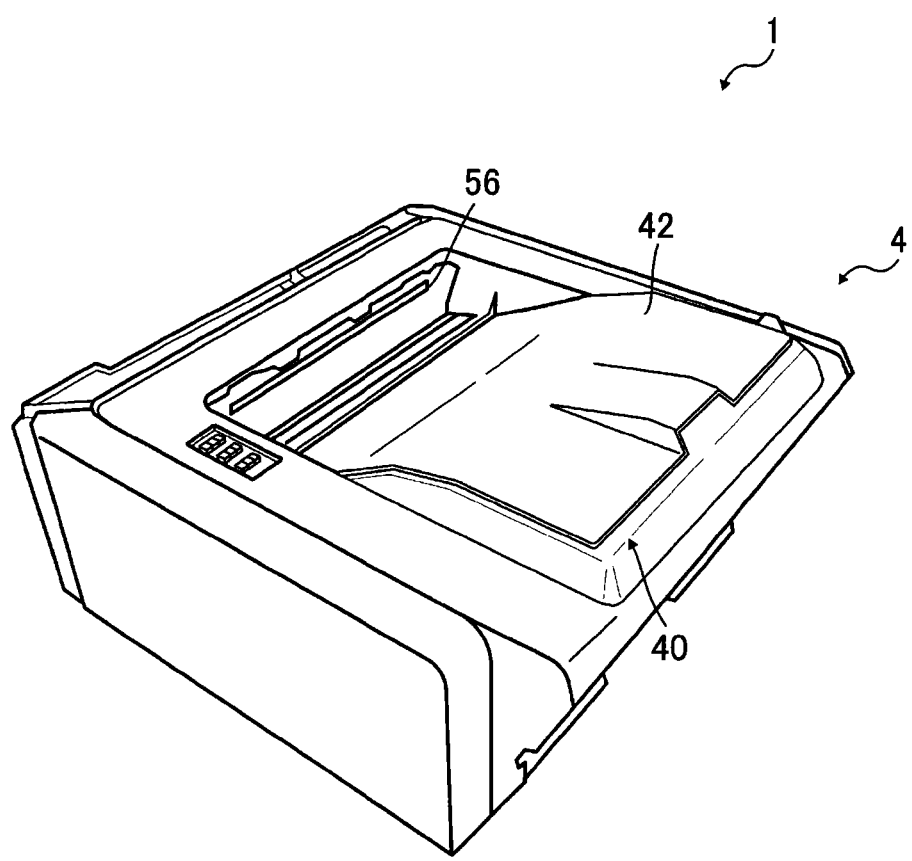
FIG. 6 is a perspective view showing the image forming apparatus in a state that the combined tray which shows embodiment of the present application is closed.
Figure 7:
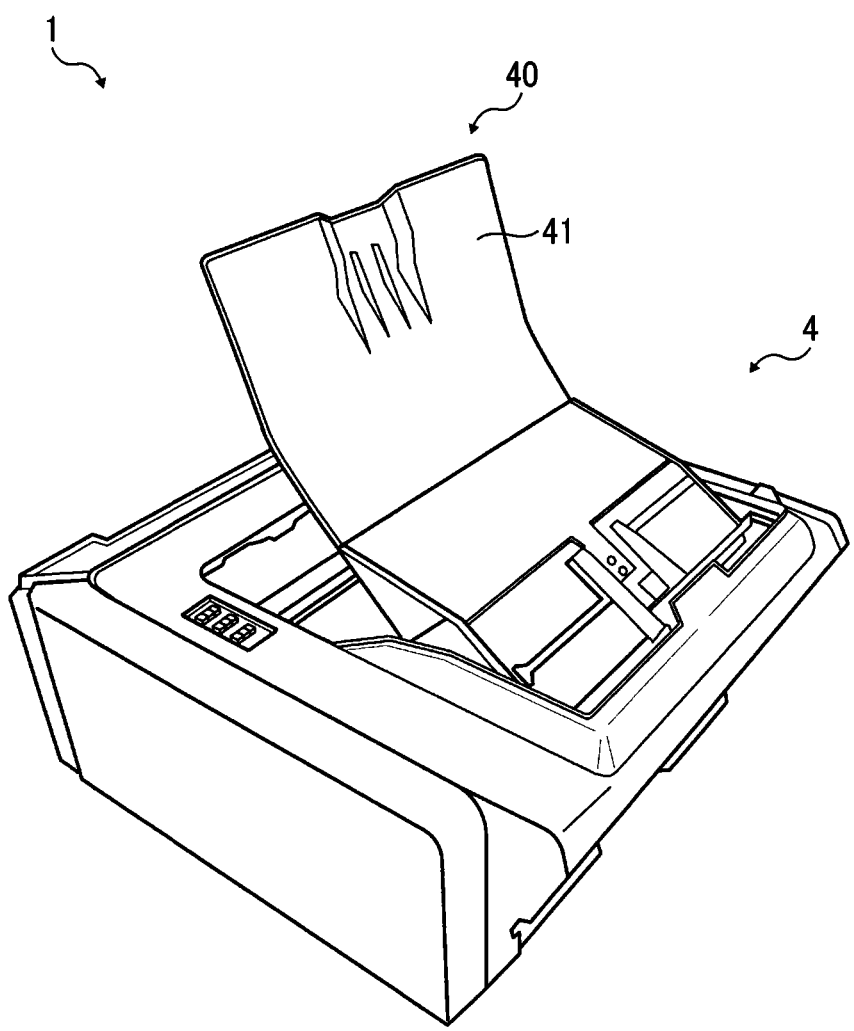
FIG. 7 is a perspective view showing the image forming apparatus in a state that the combined tray which shows embodiment of the present application is opened.

FIG. 3 and FIG. 6 show the combined tray 40 can be in a closed state if ADF 20 is not used, for example the image forming apparatus 1 is used as a printer. Here, both the rotatable member 43 and the tray plate 44 are in a folded state along the sloping face of the second discharge tray 57 when the combined tray 40 is in a closed state. As such, a surface of the combined tray 40 forms the loading surface 42 and functions as a discharge tray. Furthermore, the recording medium discharged from the outlet 56 is loaded the loading surface 42.

On the other hand, when the combined tray 40 is in a closed state, the height of the image forming apparatus 1 can be lower and the image forming apparatus 1 can be more compact. Further, the loading surface 42 is open such that it's easy to remove the recording medium discharged.

In addition, the document discharge tray 26 is folded along the shape of the image reading device 2 at that time. As such, a size in a horizontal direction of the image forming apparatus 1 can be reduced. The document discharge tray 26 may also be removed from the image reading device 2 when ADF 20 is not used.

On the other hand, in FIG. 4, the tray plate 44 is rotated in a direction shown by an arrow with a connection part to the rotatable member 43. The rotatable member 43 is rotated in the opposite direction. As such, the combined tray 40 changes from a closed state to a opened state.

In FIG. 5, the tip 44a of the tray plate 44 moves while coming into contact on the second discharge tray 57 and the sloping face 72 when the combined tray 40 is opening. As such, the combined tray 40 can be opened smoothly.

Next, in FIG. 5, the tray plate 44 stops being rotated when the tip 44a of the tray plate 44 contacts a stopper 71. As such, the angle of the tray plate 44 is maintained to be the predetermined angle and the combined tray 40 is in a opened state.

A back surface of the combined tray 40 forms the document loading surface 41 and functions as the document feeding tray. When the combined tray 40 is in a opened state, ADF 20 can read the image of a document and the document is loaded on the document loading surface 41 of the tray plate 44.

In addition, when the combined tray 40 is in a opened state, the second discharge tray 57 functions as a discharge tray and the recording medium discharged from the outlet 56 is loaded on the second discharge tray 57.

On the other hand, if the tray plate 44 rotates in a direction opposite to the rotary direction when the combined fray 40 is in a opened state, the combined tray 40 changes from the opened state to the closed state. As such, the rotatable member 43 and the tray plate 44 are folded along the slope of the second discharge tray 57.

As stated above, in the sheet loading device 4 which shows an embodiment of the present application, the combined tray 40 functions as the document feeding tray when the combined tray 40 is in a opened state, and the combined tray 40 functions as the discharge tray when the combined tray 40 is in a closed state. Accordingly, the document feeding tray is commonly usable as the discharge tray with a same member. Therefore, the height of the unit can be lowered as compared with the conventional fray that the discharged tray is independent with the document feeding tray.

Furthermore, the tip 44a of the tray plate 44 contacts a stopper 71 over the image forming unit 6 when the combined tray 40 is in a opened state. As such, the angle of the tray plate 44 is maintained to be the predetermined angle. Therefore a document feeding performance as the document feeding tray is improved.

The invention claimed is:

1. A sheet loading device comprising:
   a document feeder that feeds a document;
   an image reading unit that reads an image of the document;
   an image forming unit that forms the image on a recording medium;
   a discharge member that discharge the recording medium; and
   a combined tray that loads the document, that receives the discharged recording medium, and that is attached to the image reading unit so as to be opened and closed;
   wherein the combined tray is a document feeding tray which loads the document into the document feeder when the combined tray is opened, and the combined tray is a discharge tray which receives the discharged recording medium when the combined tray is closed.

2. An image forming apparatus comprising:
   a document feeder that feeds a document;
   an image reading unit that reads an image of the document;
   an image forming unit that forms the image on a recording medium;
   a discharge member that discharge the recording medium; and
   a combined tray that loads the document, that receives the discharged recording medium, and that is attached to the image reading unit so as to be opened and closed;
   wherein the combined tray is a document feeding tray which loads the document into the document feeder when the combined tray is opened, and the combined tray is a discharge tray which receives the discharged recording medium when the combined tray is closed.

3. The image forming apparatus as claimed in claim 2, wherein, the image reading unit is arranged over the image forming unit and apart from an outlet that discharges the recording medium.

4. The image forming apparatus as claimed in claim 2,
   wherein, the combined tray comprises:
      a rotatable member attached freely rotatable to the image reading unit so as to change between an opened state and a closed state; and
      a tray plate attached to a tip of the rotatable member so as to be able to rotate in a reverse direction to a rotatory direction of the rotatable member,
   wherein, the combined tray changes from the closed state to the opened state when the tray plate rotates in the reverse direction to the rotatory direction of the rotatable member, and a front surface of the tray plate is the discharge tray when the combined tray is closed, a backside of the tray plate is the document feeding tray when the combined tray is closed.

5. The image forming apparatus as claimed in claim 2, further comprising:
   a second discharge tray which is arranged under the combined tray and onto which the recording medium is discharged when the combined tray is opened,
   wherein, a gap is formed between the image reading unit and the image forming unit, and the recording medium discharged on the second discharge tray can be inserted in the gap.

6. The image forming apparatus as claimed in claim 2, further comprising:
   a stopper over the image forming unit which contacts a tip of the tray plate when the combined tray is in a opened state,
   wherein, an angle of the tray plate is maintained to be the predetermined angle by the stopper.

7. The image forming apparatus as claimed in claim 6, further comprising:
   a sloping face arranged over the image forming unit which slopes from the stopper to the discharge member.

* * * * *